July 11, 1939.  C. F. MITCHELL  2,165,290
TRANSFORMER FOR MAKING ELECTRICAL MEASUREMENTS
Filed Sept. 9, 1935  2 Sheets-Sheet 1
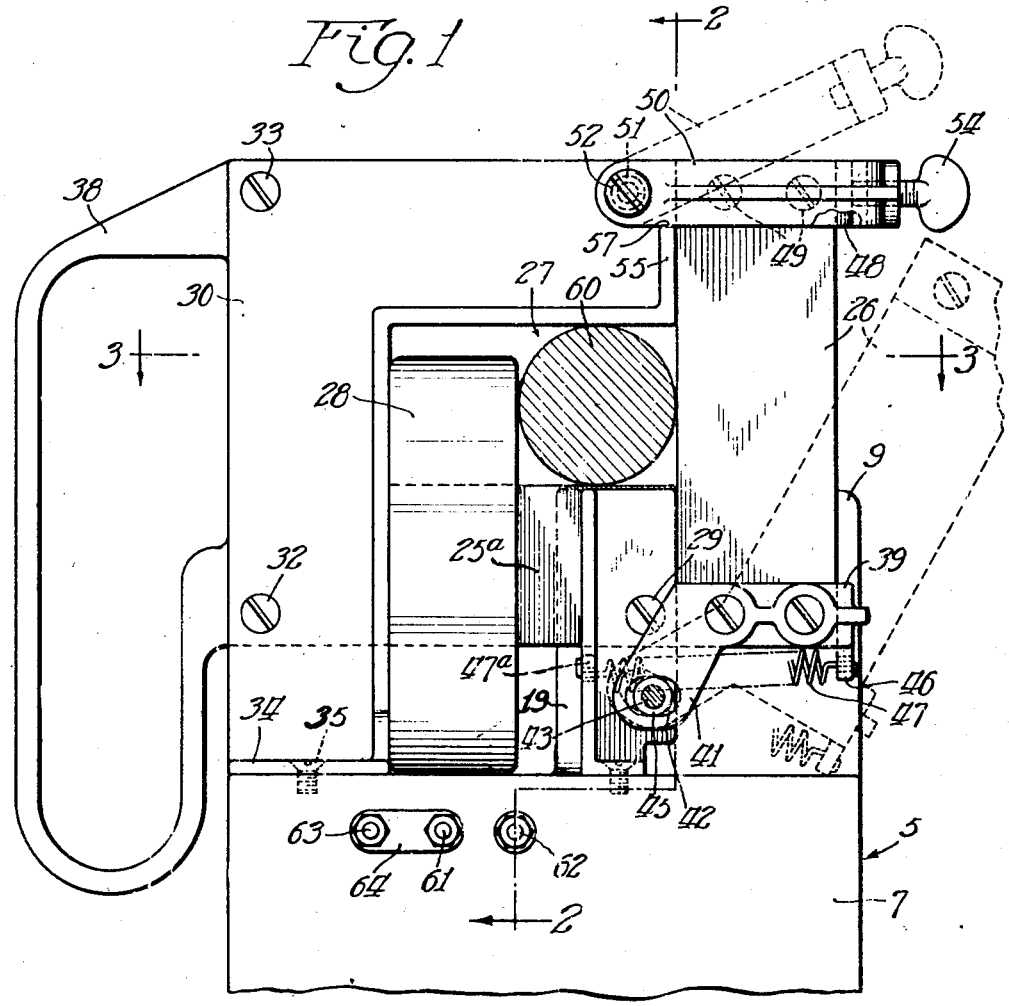
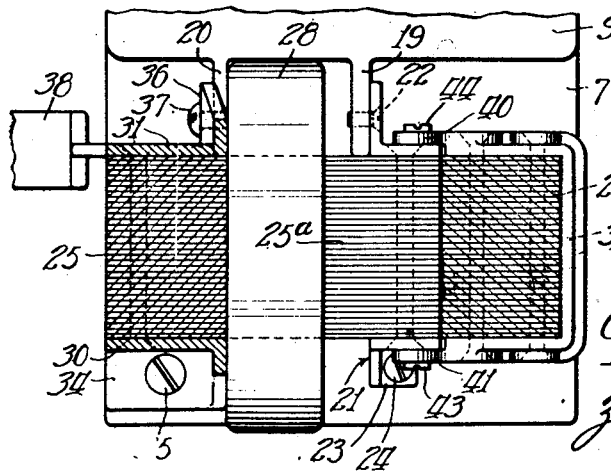
Inventor:
Chester F. Mitchell
By
Zabel Carlson & Wells
Attys

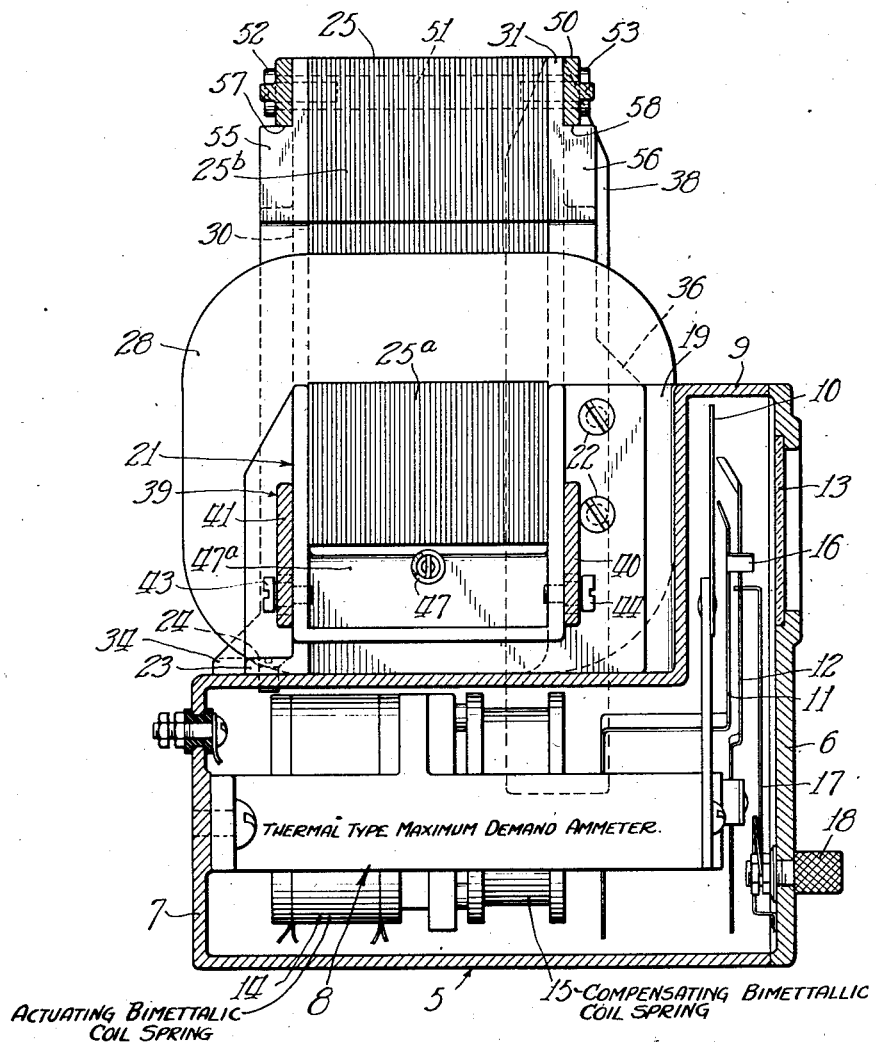

Patented July 11, 1939

2,165,290

UNITED STATES PATENT OFFICE 2,165,290

TRANSFORMER FOR MAKING ELECTRICAL MEASUREMENTS

Chester F. Mitchell, Wheaton, Ill., assignor to H D Electric Company, Chicago, Ill., a corporation of Illinois Application September 9, 1935, Serial No. 39,826

6 Claims. (Cl. 171—34)

This invention relates to maximum current measuring devices for electrical conductors and has for its principal object the provision of a novel combination whereby a maximum demand ammeter may be applied directly to an outside power line of either high or low voltage and left there to determine the maximum ampère demand on the line.

The invention contemplates the combination with a meter capable of measuring the flow of electric current in a conductor with a split core transformer in such a fashion that the meter and transformer may be hung directly upon the electrical conductor (wire, cable, or bar) as a unit.

My invention further contemplates certain novel features of construction which facilitate the use of a meter such as described in conjunction with a split core transformer whereby accurate results are obtained even though the equipment must be left exposed to the weather while the tests are being made.

Other objects and advantages will appear from the following detailed description, reference being had to the accompanying drawings wherein the preferred form of the invention is shown. It is to be understood, however, that the description and drawings are illustrative only and are not to be taken as limiting the invention except in so far as it is limited by the claims.

In the drawings—

Fig. 1 is a rear elevation of the device;

Fig. 2 is a sectional view taken substantially on the line 2—2 of Fig. 1; and

Fig. 3 is a fragmentary sectional view taken on the line 3—3 of Fig. 1.

Referring now in detail to the drawings, the numeral 5 indicates a casing which, as shown by Fig. 2, is substantially L-shaped in cross section and which has a front cover plate 6. The casing has a lower rectangular portion 7 which houses the mechanism of a maximum demand meter 8 which may be of a standard construction already known in the art such, for example, as the Lincoln demand meter manufactured by the Lincoln Meter Company of Springfield, Illinois.

The casing 5 further provides an upwardly extending front portion 9 to receive a dial 10 of the demand meter 8 and to provide suitable space for an indicating pointer 11 and a demand pointer 12 of the demand meter 8. The front cover 6 has a window 13 for observing the readings of the meter.

Although the details of the meter form no part of the present invention, it may be said that the pointer 11 is responsive to current flow being tested by the demand meter, the current flow being directed to a resistance heating unit adjacent to a bimetallic coil spring 14 of the meter 8, a second bimetallic coil spring 15 being provided to compensate for ambient temperatures. The pointer 11 has a lug 16 thereon which engages the pointer 12 and moves the pointer 12 with pointer 11 as the current increases, but the pointer 12 remains held in position by a friction device until again moved by the lug 16 so that the position of the pointer 12 indicates the maximum current demand measured by the meter 8 during the period when the meter is connected to a conductor. For returning the pointer 12 to zero, the cover 6 carries a spring arm 17 which normally is sufficiently released to not interfere with the movement of the pointer 12, but which may be forced against the pointer 12 by turning a knob 18 mounted in the front cover 6 so as to return the pointer 12 to zero.

The portion 9 of the casing 5 carries a pair of webs 19 and 20 projecting out over the rectangular portion 7 of the casing. The web 19 has a U-shaped supporting bracket 21 secured thereto by a pair of screws 22, and this bracket 21 also has a foot at 23 secured by a suitable screw 24 to the top of the rectangular portion 7 of the casing. The U-shaped bracket 21 provides a seat for one section 25 of the core of the split core transformer, the other section of the core being shown at 26.

The section 25 of the split core transformer is built up of a series of laminations which are substantially U-shaped in plan, leaving a hollow space at 27 which is completely enclosed by the sections 25 and 26. A coil 28 is mounted around a lower leg 25a of the section 25 of the transformer core. The laminations of the section 25 are held together between the side portions of the U-shaped bracket 21 by means of a suitable screw 29. They are also further clamped together by a side plate 30 and a side plate 31.

The side plate 30 and the side plate 31 are connected by screws 32 and 33 passing through the laminations as is usual of devices of this character. The side plate 30 has a foot portion 34 which rests upon the top of the rectangular portion 7 of the casing 5 and is secured thereto by a screw 35. The side plate 31 has a flange 36 which is secured by a screw 37 to the web 20 and the side plate 31 furthermore has integral therewith a handle 38 for carrying the instrument.

The movable section 26 of the core of the transformer is hinged to the stationary section in the following manner: A U-shaped clamp 39 for the laminations of the section 26 has arms 40 and 41 which arms project outwardly and downwardly and are provided at their free ends with openings 42 which openings are elongated in a direction parallel to the lower end of the section 26. These arms are secured upon pivots provided by the screws 43 and 44. Brass bushings such as 45 are provided on the screws 43 and 44 for bearings in the openings 42.

The clamp 39 has a depending lug 46 to which a spring 47 is connected, the other end of the spring being connected to a web 47a on the U-shaped bracket 21 so that the spring 47 in the closed position of the transformer section 26 lies above the pivotal axis of the arms 40 and 41. Thus, the spring 47 has the tendency to hold the section 26 in its closed position when the same is closed and when the section 26 is swung out into the dotted line position shown in Fig. 1, the spring 47 tends to hold the section 26 in open position. The elongated openings 42 are essential to provide lost motion in the hinge so that the spring 47 can maintain the section 26 tight up against the end face of the leg 25a of section 25 of the transformer core.

The upper ends of the laminations in section 26 are clamped together by a U-shaped member 48 which may be secured to the laminations by suitable screws 49. In order to clamp the upper end of the section 26 against the end of the leg 25b of the section 25, I pivot a yoke 50 on the ends of the pin 51 which passes through the side plates 30 and 31 and secure the yoke on this pin 51 by screws 52 and 53 so that the yoke may be raised and lowered.

A locking screw 54 is provided in the yoke for tightening against the U-shaped clamp 48 as indicated at Fig. 1 to draw the upper end of the section 26 against the section 25. The side plates 30 and 31 have flanges 55 and 56 which are cut away as shown in Fig. 2 to provide shoulders at 57 and 58 limiting the downward swinging movement of the yoke 50.

A conductor 60 is shown in Fig. 1 in the position it would occupy when the instrument is hung on a power line. When the conductor is in this position, it forms the support for the instrument, and it will be evident from the drawings that in this position where the conductors run horizontally, the instrument will be held in upright position. If it is desired to mount the instrument on a vertical conductor, this can be done, in which case the cover 6 for the casing 5 must face downward in order that heat generated by the current passing through the resistance unit associated with the spring 14 may not affect the ambient temperature coil 15.

The coil 28, which operates as a secondary coil where the conductor 60 constitutes the primary coil of the transformer, is preferably made to have about 58 turns of wire, and is tapped at the eighteenth turn. The coil is impregnated to withstand weather, and is protected with horn fiber on the inner side. On the outside, the coil is wrapped with a double layer of cotton tape impregnated and painted with a weatherproof paint.

The opening in the core in addition to receiving the coil 28 has enough space to take a conductor of about 350,000 circular mills in cross section. When a 60 to 1 ratio is desired between the line current and the current fed to the meter, all turns of the coil 28 are used, while for smaller ratios the intermediate tap may be used.

One of the advantages in the present device lies in the fact that I am able to use the smallest possible size opening through the split core for the electrical conductor in which the current is to be measured. This is important because the principal use for this device is in the measurement of current in conductors leading to or from a power transformer usually of the distribution type.

By the use of the double ratio secondary coil, it is possible to test practically all sizes of transformers. The smaller sizes are tested on the low voltage side, while the larger sizes are tested on the high voltage side. In this way, the high or low voltage side conductors, whichever one will give a current reading on the most open part of the scale or which may be best fitted for the openings in the split core, can be used.

The combination of the split core device and the meter in one unit makes it possible to use very short lead wires between the secondary coil and the meter element. For example, one terminal of the coil 28 is grounded to the case as is one terminal of the heater on coil spring 14. The other terminal of the heater on coil spring 14 is brought out and connected to a central insulated terminal 61 on the casing 5. The 18 turn tap of the coil 28 is connected to the terminal 62, and the 58 turn or end terminal of the coil 28 is connected to the terminal 63. A suitable link 64 is used to connect either terminals 62 or 63 to the meter terminal 61.

The particular manner of connecting the hinged section 26 of the core to the main part of the transformer core makes it possible for the section 26 to adjust itself against the adjacent faces of the section 25 with a minimum air gap. The elongated holes 42 and the spring 47 provide the necessary play to permit the hinged section 26 to align its face parallel with the face of the main part of the core.

From the above description, it is believed that the construction and advantages of the present device will be clear to those skilled in this art.

Having thus described one specific form of my invention, what I claim as new and desire to secure by Letters Patent is:

1. In an electrical measuring instrument adapted to be hung upon a conductor and supported thereby during the taking of electrical measurements, a split core transformer having a U-shaped core section, and a second core section mounted for movement toward and away from the ends of the first named section, said transformer including a coil on said U-shaped core section, a pair of side plates fastened on said U-shaped core section, one plate having a handle thereon, and a bracket fixed on one leg of said U-shaped core section and having means thereon supporting said second core section.

2. In an electrical measuring instrument adapted to be hung upon a conductor and supported thereby during the taking of electrical measurements, a split core transformer having a U-shaped core section, and a second core section mounted for movement toward and away from the ends of the first named section, said transformer including a coil on said U-shaped core section, a pair of side plates fastened on said U-shaped core section, one plate having a handle thereon, and a bracket fixed on one leg of said U-shaped core section and having means thereon supporting said second core section, one plate and said bracket having mounting feet thereon.

3. In an electrical measuring instrument adapted to be hung upon a conductor and supported thereby during the taking of electrical measurements, a split core transformer having a U-shaped core section, and a second core section mounted for movement toward and away from the ends of the first named section, said transformer including a coil on said U-shaped core section, a pair of side plates fastened on said U-shaped core section, one plate having a handle thereon, and a bracket fixed on one leg of said U-shaped core section and having means thereon supporting said second core section, said means comprising a bracket fixed to the second core section and hinged on said first named bracket, and spring means connecting said brackets for holding the second core section against the U-shaped core section.

4. In an electrical measuring instrument adapted to be hung upon a conductor and supported thereby during the taking of electrical measurements, a split core transformer having a U-shaped core section, and a second core section mounted for movement toward and away from the ends of the first named section, said transformer including a coil on said U-shaped core section, a pair of side plates fastened on said U-shaped core section, one plate having a handle thereon, and a bracket fixed on one leg of said U-shaped core section and having means thereon supporting said second core section, said means comprising a bracket fixed to the second core section and hinged on said first named bracket, said hinged bracket having a limited sliding movement toward and away from the U-shaped section of the core, and spring means connecting said brackets for holding the second core section against the U-shaped core section.

5. In an electrical measuring instrument adapted to be hung upon a conductor and supported thereby during the taking of electrical measurements, a split core transformer having a U-shaped core section, and a second core section mounted for movement toward and away from the ends of the first named section, said transformer including a coil on said U-shaped core section, and a bracket fixed on one leg of said U-shaped core section and having means thereon supporting said second core section, said means comprising a bracket fixed to the second core section and hinged on said first named bracket, said hinged bracket having a limited sliding movement toward and away from the U-shaped section of the core, and spring means connecting said brackets for holding the second core section against the U-shaped core section.

6. In an electrical measuring instrument adapted to be hung upon a conductor and supported thereby during the taking of electrical measurements, a split core transformer having a U-shaped core section, and a second core section mounted for movement toward and away from the ends of the first named section, said transformer including a coil on said U-shaped core section, a pair of side plates fastened on said U-shaped core section, one plate having a handle thereon, and a yoke carried by said plates and swingable over one end of the second core section, said yoke having means to press the core sections together.

CHESTER F. MITCHELL.